United States Patent
Thomson et al.

(10) Patent No.: US 10,164,418 B2
(45) Date of Patent: Dec. 25, 2018

(54) MOUNTING DEVICE FOR AN ELONGATE FLEXIBLE MEMBER

(71) Applicant: First Subsea Limited, Lancaster, Lancashire (GB)

(72) Inventors: Craig Richard Thomson, Lancaster (GB); John Stuart Shaw, Lancaster (GB)

(73) Assignee: First Subsea Limited, Lancaster (Lancashire) (GB)

( * ) Notice: Subject to any disclaimer, the term of this patent is extended or adjusted under 35 U.S.C. 154(b) by 0 days.

(21) Appl. No.: 15/550,694

(22) PCT Filed: Feb. 10, 2016

(86) PCT No.: PCT/GB2016/050309
§ 371 (c)(1),
(2) Date: Aug. 11, 2017

(87) PCT Pub. No.: WO2016/128739
PCT Pub. Date: Aug. 18, 2016

(65) Prior Publication Data
US 2018/0034254 A1    Feb. 1, 2018

(30) Foreign Application Priority Data

Feb. 13, 2015  (GB) .................................. 1502424.3
Sep. 18, 2015  (GB) .................................. 1516593.9

(51) Int. Cl.
*H02G 1/10*    (2006.01)
*H02G 3/22*    (2006.01)
(Continued)

(52) U.S. Cl.
CPC ................. *H02G 3/22* (2013.01); *H02G 1/10* (2013.01); *F03D 80/85* (2016.05)

(58) Field of Classification Search
CPC .... E21B 17/017; E21B 43/0107; F03D 80/85; F16L 1/123; F16L 3/08; F16L 3/085;
(Continued)

(56) References Cited

U.S. PATENT DOCUMENTS 5,466,015 A * 11/1995 Berenter .................. F16L 5/00
                                                          285/12
5,967,477 A    10/1999 Walmsley
(Continued)

FOREIGN PATENT DOCUMENTS

GB    2424684 A * 10/2006   .......... E21B 17/017
WO    2010038056 A2   4/2010
WO    2011141494 A1   11/2011

OTHER PUBLICATIONS

ISR and Written Opinion PCT/GB2016/050309, dated May 2, 2016.
UK 1502424.3 UKIPO Search Report, dated May 12, 2015.
Uk 1516593.9 UKIPO Search Report, dated Nov. 10, 2015.

*Primary Examiner* — Timothy Thompson
*Assistant Examiner* — Guillermo Egoavil
(74) *Attorney, Agent, or Firm* — TannerIP PLLC; Daniel A. Tanner, III; James E. Golladay, II

(57) ABSTRACT

Mounting devices for an elongate flexible member, such as an electrical cable passing through the wall of a structure, are described. The mounting devices may include an elongate body having a longitudinal axis and elongate recesses that are inclined with respect to the longitudinal axis. An internal passageway for the elongate flexible member may pass through the elongate body parallel to the longitudinal axis, and apertures corresponding to the recesses may be disposed in the outer peripheral face of the elongate body. An engagement member, such as a ball, may be mounted in each recess and move along the recess. The engagement members, recesses and the apertures may be dimensioned to allow the engagement members to project partially beyond (Continued)

the outer peripheral face of the elongate body but to prevent the engagement members from leaving the recesses through the apertures in the outer peripheral face of the elongate body.

40 Claims, 7 Drawing Sheets

(51) Int. Cl.
  *H02G 9/00* (2006.01)
  *F03D 80/80* (2016.01)
(58) Field of Classification Search
  CPC ......... F16L 3/12; F16L 3/1218; F16L 3/1226; F16L 35/00; F16L 5/00; F16L 37/23; F16L 57/02; H02G 1/10; H02G 3/22; H02G 3/40; H02G 9/00; H02G 9/02; Y10T 29/49826

USPC ............... 29/428; 174/650, 669; 285/321
  See application file for complete search history.

(56) References Cited

U.S. PATENT DOCUMENTS

| | | | |
|---|---|---|---|
| 6,152,645 A | 11/2000 | Sanford | |
| 8,745,944 B1* | 6/2014 | Feil, III | F16L 5/04 |
| | | | 52/232 |
| 9,273,523 B2* | 3/2016 | McIntosh | E21B 19/06 |
| 9,441,424 B2* | 9/2016 | Beesley | E21B 17/017 |
| 2008/0007056 A1 | 1/2008 | Beesley | |
| 2008/0164693 A1 | 7/2008 | Weems et al. | |
| 2010/0078178 A1 | 4/2010 | Watson | |
| 2013/0025901 A1* | 1/2013 | Shi | B25B 21/00 |
| | | | 173/216 |
| 2016/0327308 A1* | 11/2016 | Deivasigamani | F24F 13/32 |

* cited by examiner

MOUNTING DEVICE FOR AN ELONGATE FLEXIBLE MEMBER

RELATED APPLICATIONS

This application is a National Stage Entry of International Patent Application PCT/GB2016/050309, filed Feb. 10, 2016, and entitled "MOUNTING DEVICE FOR AN ELONGATE FLEXIBLE MEMBER," and claims priority to United Kingdom Patent Application GB 1502424.3, filed Feb. 13, 2015, and United Kingdom Patent Application GB 1516593.9, filed Sep. 18, 2015, the contents of which are all hereby incorporated by reference for all purposes.

BACKGROUND

The present invention relates to devices for mounting an elongate flexible member in an aperture extending through a wall of a structure, and to a protection device for an elongate flexible member comprising such a mounting device.

In offshore energy applications, it is normally necessary to secure an elongate flexible member, such as an electrical cable, to an offshore installation. This is normally achieved by securing one end of the elongate flexible member into a so-called J-tube or I-tube mounted on the structure.

However, there are some circumstances where the elongate flexible member must first pass through an aperture in a wall of the structure to which it is to be connected. A typical example of this would be where an electrical cable passes through the wall of a monopole mounted on the seabed, which forms the body of an offshore wind turbine. In such circumstances, it is necessary for the cable to be pulled through an aperture in the wall of the monopole without causing damage to the monopole itself.

SUMMARY

It is an aim of the present invention to provide a device which allows an elongate flexible member to be pulled through an aperture, but which is securely retained in position in the aperture.

In accordance with a first aspect of the present invention, a mounting device for an elongate flexible member extending through a wall of a structure comprises:

an elongate body having a longitudinal axis;

an internal passageway passing through the elongate body parallel to the longitudinal axis, for receipt of the elongate flexible member;

a plurality of elongate recesses in the elongate body, the axis of each recess being inclined to the longitudinal axis of the elongate body;

a plurality of apertures in the outer peripheral face of the elongate body, each of said apertures corresponding to a respective one of the recesses;

an engagement member displaceably mounted in each recess, the engagement members, recesses and the apertures being dimensioned to allow the engagement members to project partially beyond the outer peripheral face of the elongate body but to prevent the engagement members from leaving the recesses through the apertures in the outer peripheral face of the elongate body; and biasing means biasing the engagement members along the recesses towards the apertures in the outer peripheral face of the elongate body.

When an elongate flexible member, such as a cable, is fitted with such a device, it can be pulled through the aperture in the wall of the structure to which it is to be mounted. The body of the device is designed to be slightly smaller than the aperture through which the cable passes, but the engagement members are designed to protect from the outer peripheral face of the body so that they engage the periphery of the aperture as the device is pulled through.

As the device is pulled through, the engagement members are displaced against the restoring force of the biasing means, which allows the device to be partially pulled through the aperture. However, when the force pulling the device through the aperture is removed, the biasing means biases the balls outwardly so that they engage with the periphery of the aperture through which the device extends.

Any attempt to move the device in rearward direction causes the engagement members to be urged up the inclined recesses, thereby urging the engagement members radially outwardly into stronger contact with the aperture through which the device passes.

Consequently, the device is able to move forwardly through the aperture in one direction but is prevented from moving back out of the aperture in the opposite direction.

In one embodiment, the longitudinal axis of the internal passageway is aligned with the longitudinal axis of the elongate body.

Preferably, the internal passageway is cylindrical. Preferably, the outer peripheral face of the elongate body is also cylindrical.

The device preferably comprises a plurality of identical recesses.

In one embodiment, the device comprises a plurality of identical recesses inclined at the same angle with respect to the longitudinal axis of the elongate body.

The device preferably comprises a first plurality of recesses spaced around the elongate body at a first longitudinal position of the elongate body.

Preferably, the device further comprises a second plurality of recesses spaced around the elongate body at a second longitudinal position of the elongate body. In this way, if the device passes at an angle through the aperture in the wall of the structure to which the cable is to be connected at an angle (which it normally will), engagement with a larger number of engagement members is guaranteed, compared with the situation where all of the engagement members are arranged at the same longitudinal position of the elongate body.

Preferably, the recesses of the first plurality of recesses are offset circumferentially with respect to the recesses of the second plurality of recesses. In this way, the number of balls which engage the periphery of the aperture through which the device passes is further increased.

In one embodiment, the elongate body comprises a first annular member in which the first plurality of recesses are located and a second annular member in which the second plurality of recesses are located.

This allows pre-assembly of the engagement members in the recesses, and the annular members can then be assembled subsequently.

In a preferred embodiment, the elongate body further comprises an elongate sleeve on which the first and second annular members are mounted.

Preferably, the elongate sleeve forms the elongate passageway through the elongate body.

In a preferred embodiment, the device comprises a plurality of engagement members displaceably mounted in each recess.

The device may comprise a first engagement member which can be displaced to project partially out of the aperture in the outer peripheral face of the elongate body and a second engagement member in engagement with the first engagement member.

Preferably, the biasing means engages the second engagement member.

Preferably, the biasing means is located in the recess, and in a preferred embodiment the biasing means comprises a spring.

In one embodiment, the device comprises a plurality of recesses which extend to the outer peripheral face of the elongate body, the outer ends of the recesses forming said apertures in the outer peripheral face of the elongate body.

The device may also comprise means for displacing the engagement members inwardly, along the recesses, preferably comprising means for selectively engaging the projecting part of the engagement members to displace them inwardly.

By being able to displace the engagement members radially inwardly, it is possible to disengage the engagement members from an aperture in which the mounting device is secured, thereby facilitating removal of the device if it ever becomes necessary to do so.

The device may comprise movable engagement means on the exterior of the elongate body.

In one embodiment, the device comprises a movable tubular sleeve member which forms at least part of the exterior of the elongate member.

In this embodiment, the apertures through which the engagement members project are provided in the movable tubular sleeve member.

The device preferably further comprises one or more further apertures for engagement of the tubular sleeve member in order to displace it in a direction which causes the engagement members to be displaced inwardly.

Preferably, one or more, and more preferably each, of the engagement members comprises a ball.

Conveniently, the movable tubular sleeve member may comprise a projection which is accessible through the one or more further apertures.

The device preferably further comprises means for retaining the movable engagement means in a first position, e.g. a shear bolt.

Preferably, the device comprises connecting means for connection to an elongate hollow protective device for passage of the elongate flexible member.

More preferably, the device comprises connecting means at both ends of the elongate body, each for connection to an elongate hollow protective device.

The device may comprise connecting means for connection to a centraliser and/or connecting means for connection to a cable protection device, e.g. a bend stiffener.

In accordance with a second aspect of the present invention, a protection device for an elongate flexible member comprises a mounting device in accordance with the first aspect of the present invention, in combination with at least one elongate hollow protective device connected to the mounting device.

Preferably, the protection device comprises two elongate hollow protective devices, connected at opposite ends of the mounting device.

BRIEF DESCRIPTION OF THE DRAWINGS

By way of example only, a specific embodiment of the present invention will now be described, with reference to the accompanying drawings, in which.

DETAILED DESCRIPTION OF EMBODIMENTS

Figure 1:
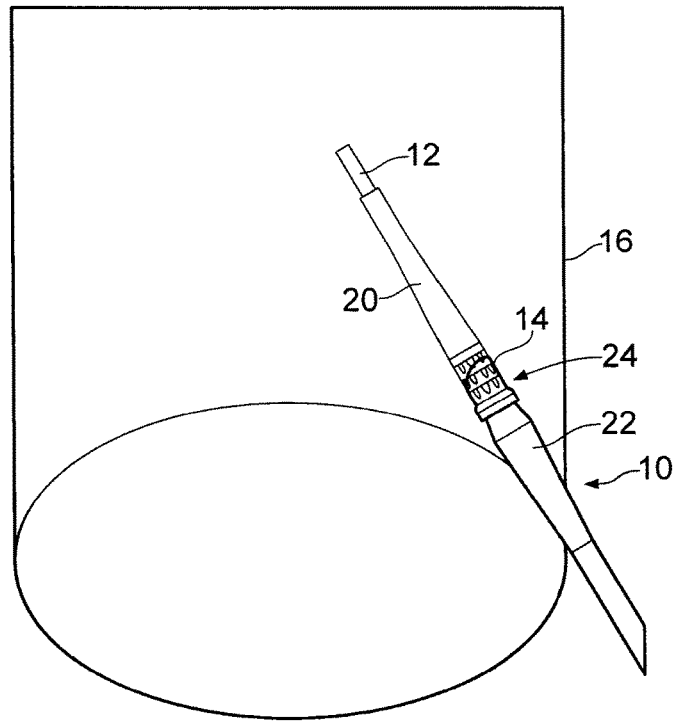
FIG. 1 is a perspective view of a portion of a cable protection assembly comprising an embodiment of mounting device in accordance with the present invention, shown installed in a support pillar of an offshore wind turbine.
Figure 3:
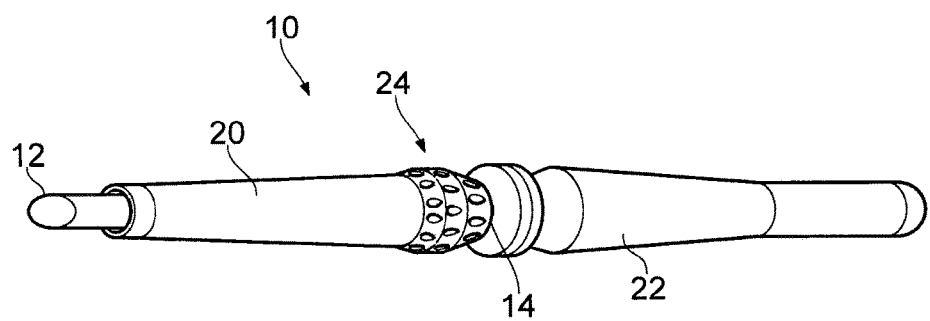
FIG. 3 is an inverted plan view of the cable protection assembly of FIG. 1.
Figure 2:
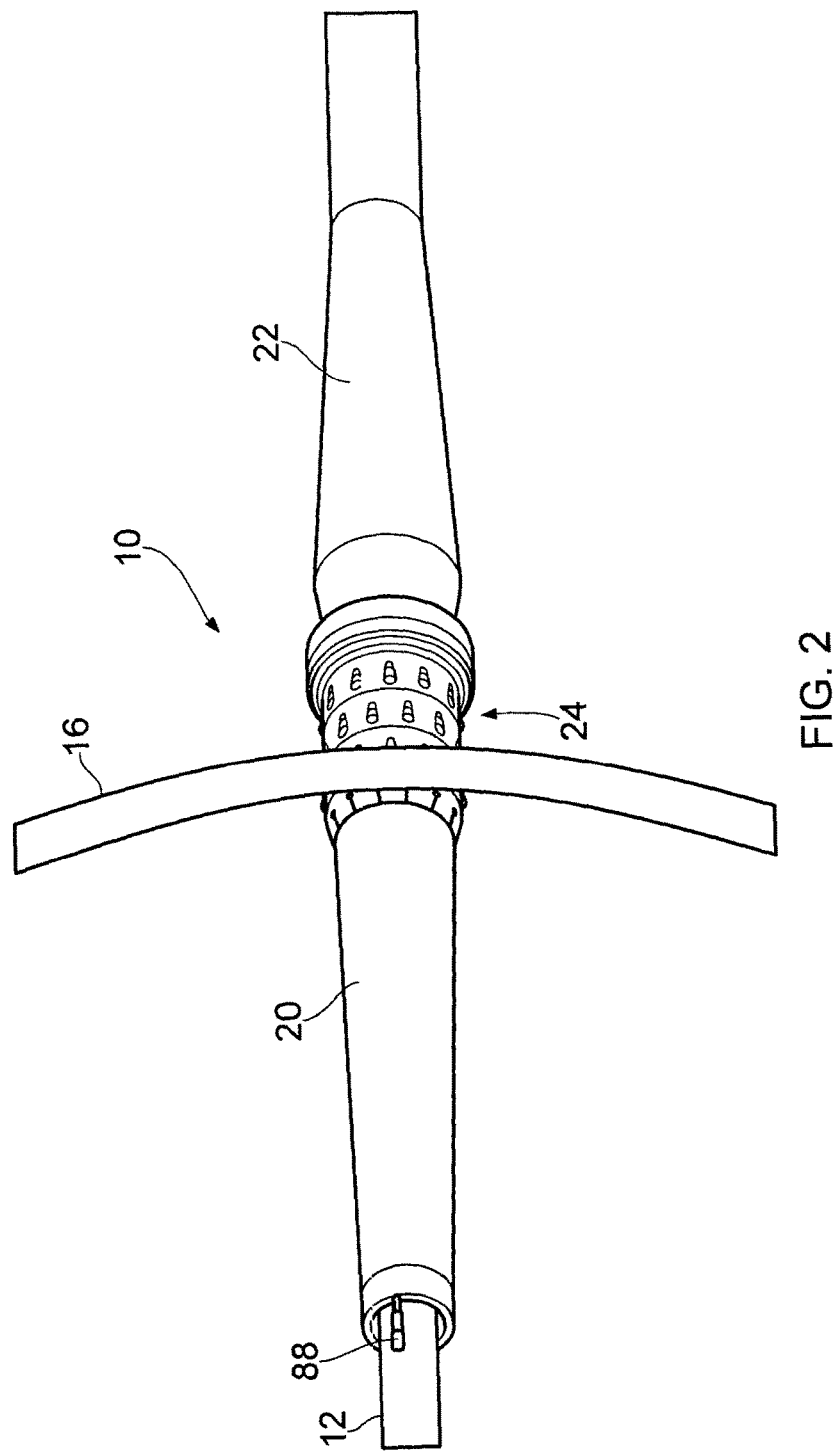
FIG. 2 is a plan view of the cable protection assembly of FIG. 1.

FIGS. 1 to 4 illustrate an embodiment of cable protection assembly 10 for a flexible electrical cable 12, secured in an aperture 14 in the wall of a support pillar 16 of an offshore wind turbine. The cable 12 is intended to be connected to the generator of the wind turbine and the cable protection assembly 10 encloses the electrical cable 12 and both protects the cable from the underwater environment and prevents it from being bent to a radius which would damage the cable.

The portion of the cable protection assembly 10 illustrated in FIGS. 1 to 4 comprises a centraliser 20 and a cable protection device 22, one end of each of which is secured to a respective end of a mounting device 24. The centraliser 20 and the cable protection device 22 are conventional and comprise tubular, flexible members formed from high density polyurethane. In the embodiment described and shown, the centraliser 20 and the cable protection device 22 are formed as bend stiffeners which are tapered towards the ends remote from the mounting device and are designed to allow a predetermined degree of flexibility but to prevent bending to such an extent that would result in damage to the cable passing through them.

It should also be noted that further cable protection devices may be attached downstream of the cable protection device 22, to protect the enclosed electrical cable at locations further form the support pillar 16, for example, a series of interconnected bend restrictor elements and/or a series of flexible polyurethane tubes secured end-to-end. However, the additional cable protection devices do not form part of the present invention and will not be described further.

Figure 5:
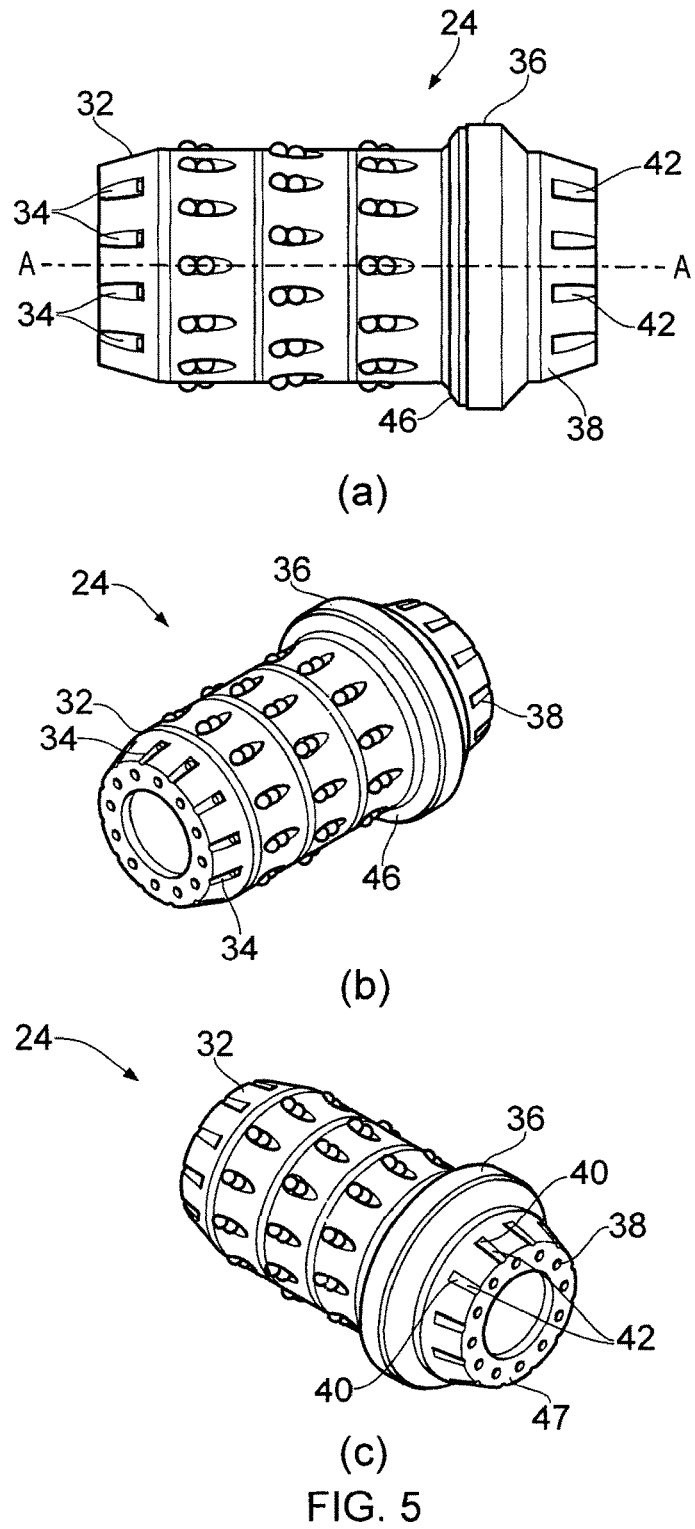
FIGS. 5(a) to (c) are a side view, front perspective view and rear perspective view respectively of the mounting device shown in FIG. 1.
Figure 6:
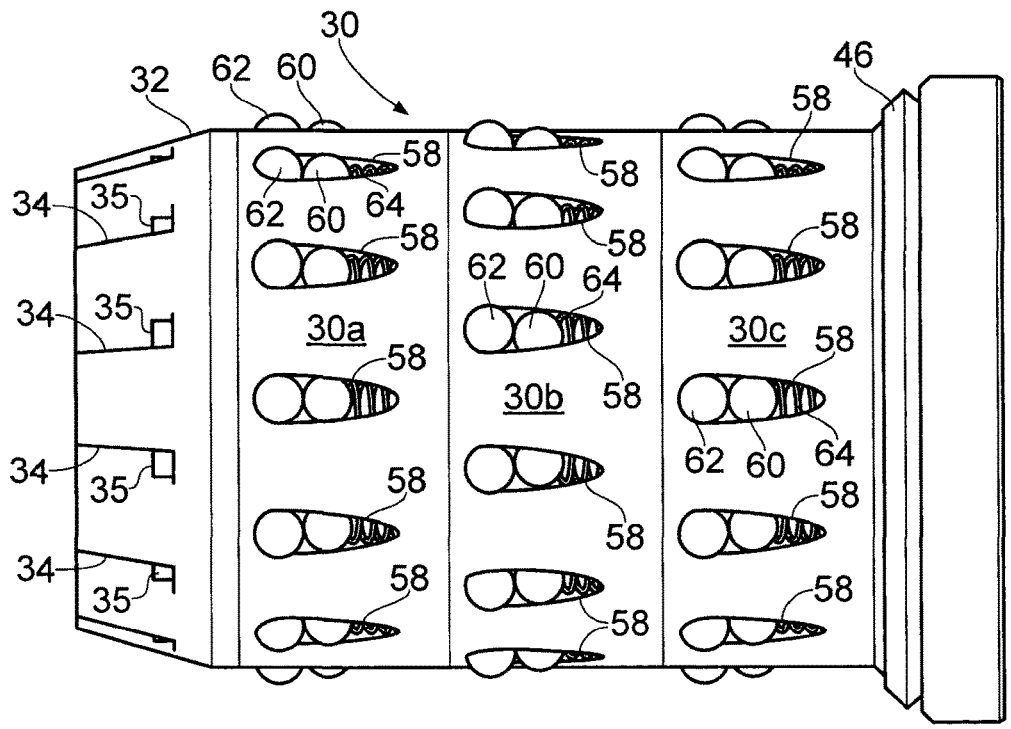
FIG. 6 is a side view, to an enlarged scale, of a front portion of the mounting device of FIGS. 1 and 5.
Figure 7:
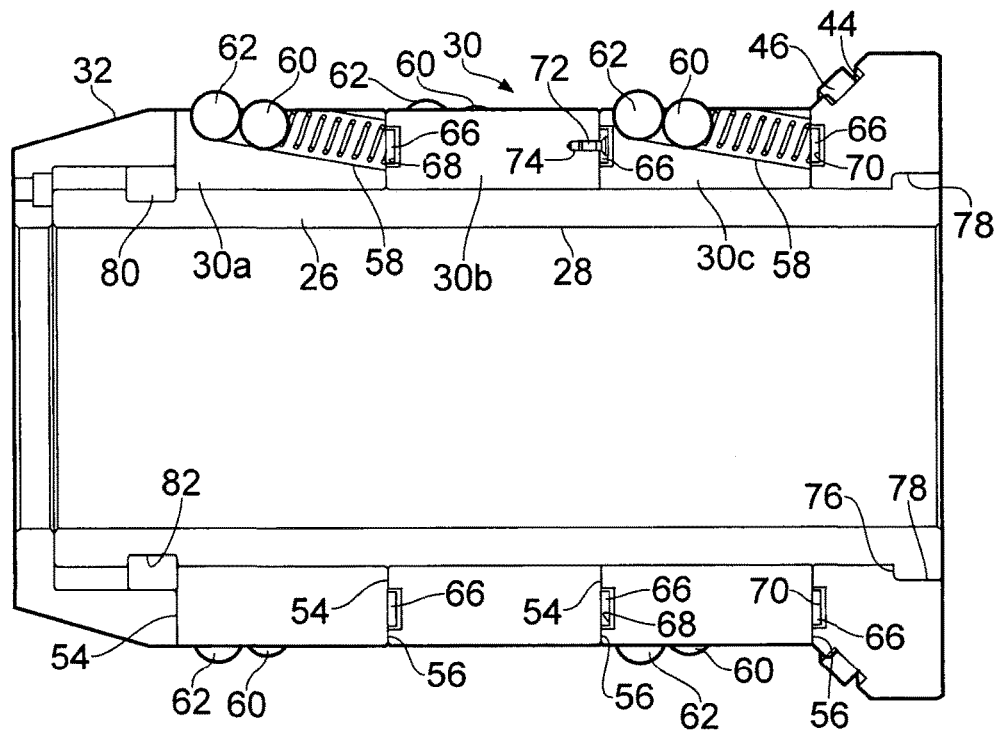
FIG. 7 is a vertical cross-section through the mounting device shown in FIG. 6.

As best seen in FIGS. 5 to 7, the mounting device 24, which is formed from alloyed steel, is elongate and tubular and comprises a tubular inner sleeve having an internal diameter which is the same as the internal diameter of the adjacent centraliser 20 and cable protection device 22 and which receives the electrical cable 12, and a tubular outer sleeve 30 secured externally of the inner sleeve. The front end of the mounting device 24 is formed into a removable tapered nose portion 32 having twelve identical elongate recesses 34, spaced equally around the circumference of the nose portion, and extending parallel to the longitudinal axis A-A of the mounting device 24. In use, each of the recesses 34 receives a securing bolt 35 which is threadedly received in a corresponding recess in the end of the outer sleeve 30 for attaching the nose portion and for securing the adjacent end of the centraliser 20.

The opposite, rear end of the mounting device 24 is provided with a first removable collar portion 36. As best seen in FIG. 5, a second removable collar portion 38 is secured to the outer face of the first collar portion 36 by means of twelve bolts 40 passing through a respective one of twelve identical elongate recesses 42 in the second collar portion 38, equally angularly spaced around the collar portion and extending parallel to the longitudinal axis A-A of the mounting device 24, and being threadedly received in corresponding recesses in the end face of the first collar portion 36. It will also be observed that the inner end face of the second collar portion is frusto-conical and is provided with a circumferential groove 44 which receives and retains a resiliently deformable elastomeric ring 46 which, as will be explained, acts as a shock absorber.

As best seen in FIG. 5(c), the outer end of the second collar portion 38 is formed into a planar face 47 which is provided with twelve identical, equally angularly spaced elongate recesses extending parallel to the longitudinal axis A-A of the mounting device 24, each for receipt of a bolt passing through a flange on the abutting end of the cable protection device 22, for securing it to the mounting device 24.

As best seen in FIGS. 6 and 7, the outer tubular sleeve portion 30 of the mounting device 24 is formed from three sleeve ring portions 30a, 30b, 30c, each having planar annular end faces 54, 56, the ring portions being arranged face-to-face. The sleeve ring portions 30b, 30c are identical and the front sleeve ring portion 30a differs only in that it does not have a groove in the front face for receipt of a retaining ring, as will be explained.

Each ring portion 30a, 30b, 30c is provided with twelve identical elongate through recesses 58. The recesses 58 are equally angularly spaced around each ring and extend from the rear face planar end 56 to the outer curved periphery of the ring, whereby the longitudinal axes of the recesses are inclined (at the same angle) to the longitudinal axis A-A of the mounting device 24.

Each recess 58 receives two identical inner and outer engagement members which in this embodiment are formed by spherical stainless steel balls 60, 62 which are urged outwardly and towards contact with one another by means of a compression spring 64 which extends between the inner ball 60 and a retaining ring 66. The retaining ring 66 is secured to the rear face of each ring portion 30a, 30b, 30c, the retaining rings 66 for the two frontmost ring portions 30a, 30b being received in a recess 68 in the front face 54 of the ring portions 30b, 30c respectively and the retaining ring 66 for the rearmost ring portion 30c being received in a recess 70 in the front planar face of the second collar portion 28. The retaining rings are held in place by means of twelve identical equally angularly spaced bolts 72 passing through each ring 66 and being threadedly received in a recess 74 in the rear face 56 of each respective ring portion 30a, 30b, 30c.

The diameter of the spherical balls 60, 62 and the diameter of the through recesses 58 are chosen so that although the balls 60, 62 can project partially out of the apertures formed in the outer peripheral face of the tubular sleeve portion 30 by the recesses 58, as urged by the springs 64, they are held captive in the recesses and are unable to be displaced out of the apertures forming the outer end of the recesses.

In use, the two balls 60, 62 and the spring 64 are inserted into each recess 58 in each ring portion 30a, 30b, 30c and are held in position by securing the retaining ring 66 in place against the rear face 56 of each ring portion, whereby each of the inner and outer spherical balls 60, 62 projects partially from its associated aperture 58 which opens out onto the curved peripheral face of the associated ring portion 30a, 30b, 30c. The second removable collar portion 38 is then slid onto the front of the inner sleeve 26 and is slid to the rear end of the sleeve 26, where it is prevented from sliding off by means of a peripheral retaining lip 76 at the rear end of the inner sleeve 26, which is received in a complementarily-shaped peripheral recess 78 in the rearmost portion of the inner curved face of the second collar portion 38.

The outer tubular sleeve portion 30 is then formed by sliding the ring portions 30c, 30b, 30a in turn on the inner sleeve 26, the outer tubular sleeve portion being held in place by means of a retaining ring 80 which is sealed in a complementarily-shaped recess 82 in the outer curved face of the inner sleeve 26, near its front end. The retaining ring 80 is a two-piece split ring, which allows it to be removably seated in the recess 82. The tapered nose portion 32 is then slid on the protruding end of the inner sleeve 26, in contact with the retaining ring 80, and is held in position on the end of the sleeve 26 by means of the securing bolts 35.

As will be apparent from the drawings, the ring portions 30a, 30b, 30c are mounted on the inner sleeve 26 so that the through recesses 58 of the front and rear rings 30a, 30b are aligned with each other and so that the through recesses 58 of the middle ring 30b are offset so that they lie mid-way between the through recesses 58 of the front and rear rings 30a, 30c.

The assembled mounting device 24 is then secured to the rear end of the centraliser 20 and to the front end of the cable protection device 22 as described previously. As mentioned earlier, there may be additional bend stiffening means and/or cable protection located around the electrical cable 12 at locations beyond the cable protection device 22.

In use, the cable protection assembly 10 is loaded onto a cable-laying vessel and fitted around a cable to be protected and is discharged over the side of the vessel into the water towards a support pillar of a turbine. This is achieved in a conventional manner by means of a pulling line (not shown) extending from the support pillar which is secured to the eye of a conventional connector member 88 which is embedded in the front end of the first centraliser 20. The pulling line will also be connected to the end of the electrical cable 12 to be laid and the connector member 88 is provided with a weak link, designed to break on application of a predetermined tension, so that when the cable protection assembly 10 is retained in the aperture 14 of the wall the support pillar 16 of the wind turbine, further pulling of the pulling line will cause the connector member to fracture and will continue to pull the electrical cable 12 through the cable protection assembly, as will be explained.

The pulling line pulls the cable protection assembly 10 and cable 12 towards the aperture 14 in the wall of the support pillar 16. Eventually, the centraliser portion 20 will pass through the aperture, which assists in aligning the cable protection assembly with the aperture. As the pulling line is pulled further, the body of the mounting device 14 enters the aperture. The outer diameter of the outer sleeve 30 of the mounting device 24 is chosen to be slightly smaller than the diameter of the aperture, but the steel balls 60, 62 are designed so that they engage with the boundary of the aperture 14 as the outer sleeve 30 passes through, such that the springs 64 bearing on such steel balls are compressed. The balls 60, 62 thus retract inwardly against the force of the associated spring 64. However, any movement of the mounting device 24 in the opposite direction causes the balls to engage the upwardly-inclined wall of the associated recess 58, urging the balls radially outwardly, so that the outer ball 62 is urged strongly with engagement with the boundary of the aperture 14, whereby the mounting device 24 is effectively prevented from moving back out of the aperture 14.

However, movement of the mounting device 24 in the forward direction is still possible, as this results in the balls 60, 62 being displaced inwardly against the restoring face of the spring 64. However, the diameter of the second collar portion is greater than the diameter of the aperture 14, so that eventually the elastomeric ring 46 mounted on the collar portion engages the outer face of the support pillar immediately outward of the aperture 14. The elastomeric ring 46 is deformed by such engagement and provides a shock absorbing effect.

However, the mounting device 24 (and the centraliser 20 and cable protection device 22 attached to it) can travel no further in the forward direction. Consequently, further tension applied to the pulling line cause the weak link of the connector member 88 to break and causes the electrical cable 12 (to which the pulling line is also attached) to be pulled through the cable protection assembly 10 and into the interior of the pillar, whereafter it can be secured in the appropriate position. The mounting device 24 remains held in place in the aperture 14. It is prevented from passing further the aperture 14 in the forward direction by engagement of the second collar with the outer face of the support pillar 16 and any attempt to move it in the opposite, reverse direction will cause those balls 62 which are engaged with the boundary of the aperture 14 to be urged radially outwardly into strong engagement with the aperture, thereby preventing the mounting device from being displaced out of the aperture.

The use of two balls 60, 62 in each through recess results in a rolling motion of the balls as they engage the boundary of the aperture 14, thereby reducing the friction between the mounting device 24 and the boundary of the aperture 14. Moreover, the configuration of the through apertures 58 and the associated balls 60, 62 (particularly the offsetting of the balls 60, 62 of the outer ring 30b with respect to the balls of the outer rings 30a, 30c) prevents the mounting device from being withdrawn out of the aperture (in the rearward direction) irrespective of the orientation of the aperture, and also ensures that a minimum of ten balls 60, 62 engage the boundary of the aperture when connected.

Figure 8:
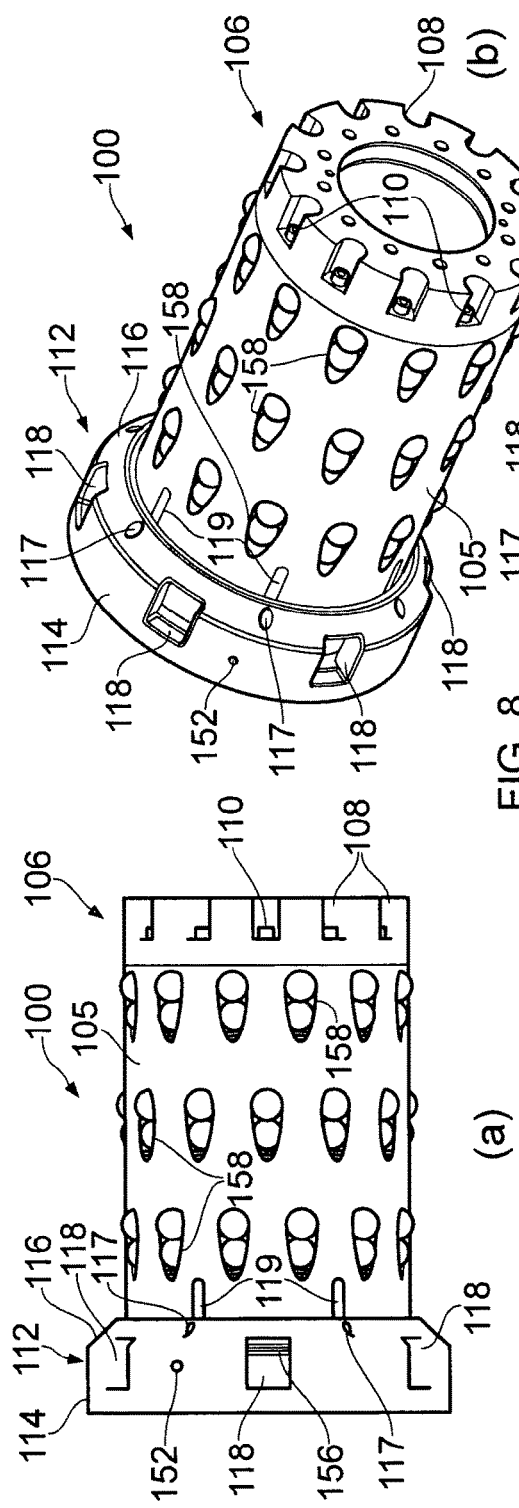
FIGS. 8(a) and 8(b) are side and perspective views respectively of a second embodiment of mounting device in accordance with the present invention, shown in an installed condition.
Figure 9:
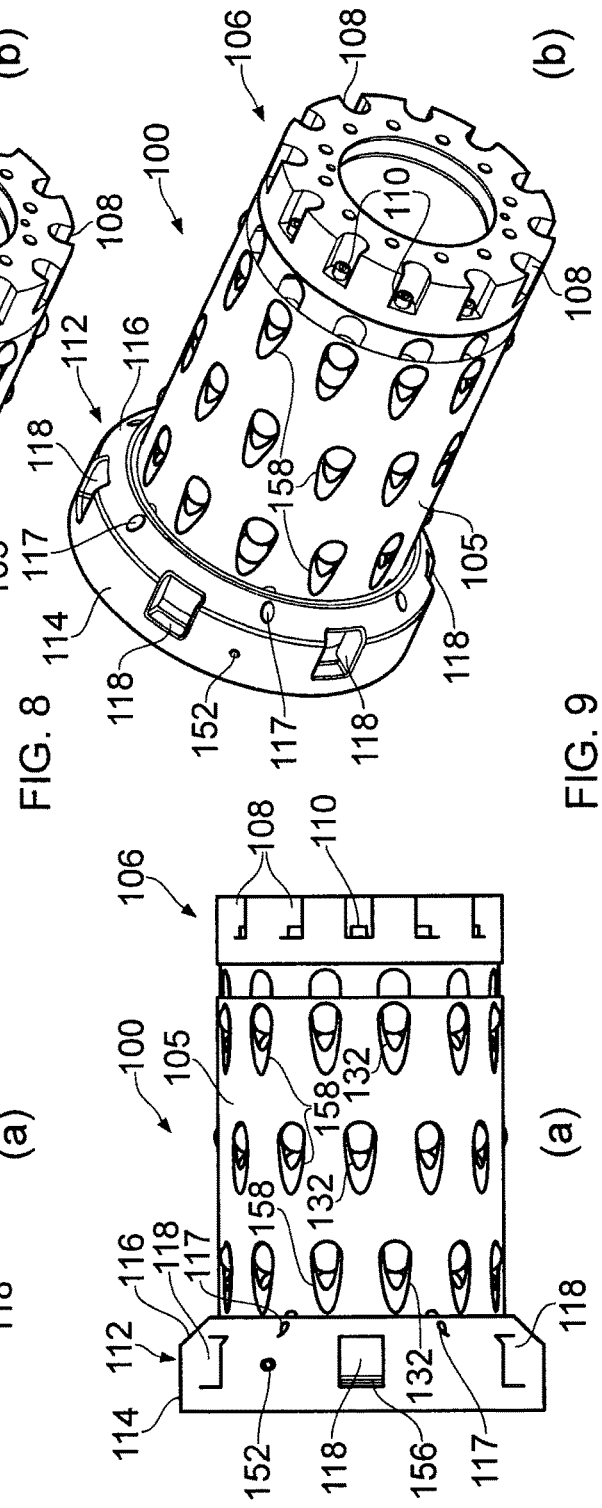
FIGS. 9(a) and 9(b) are side and perspective views respectively of a second embodiment of mounting device in accordance with the present invention, shown in a condition in which retaining balls are withdrawn, to facilitate removal.
Figure 10:
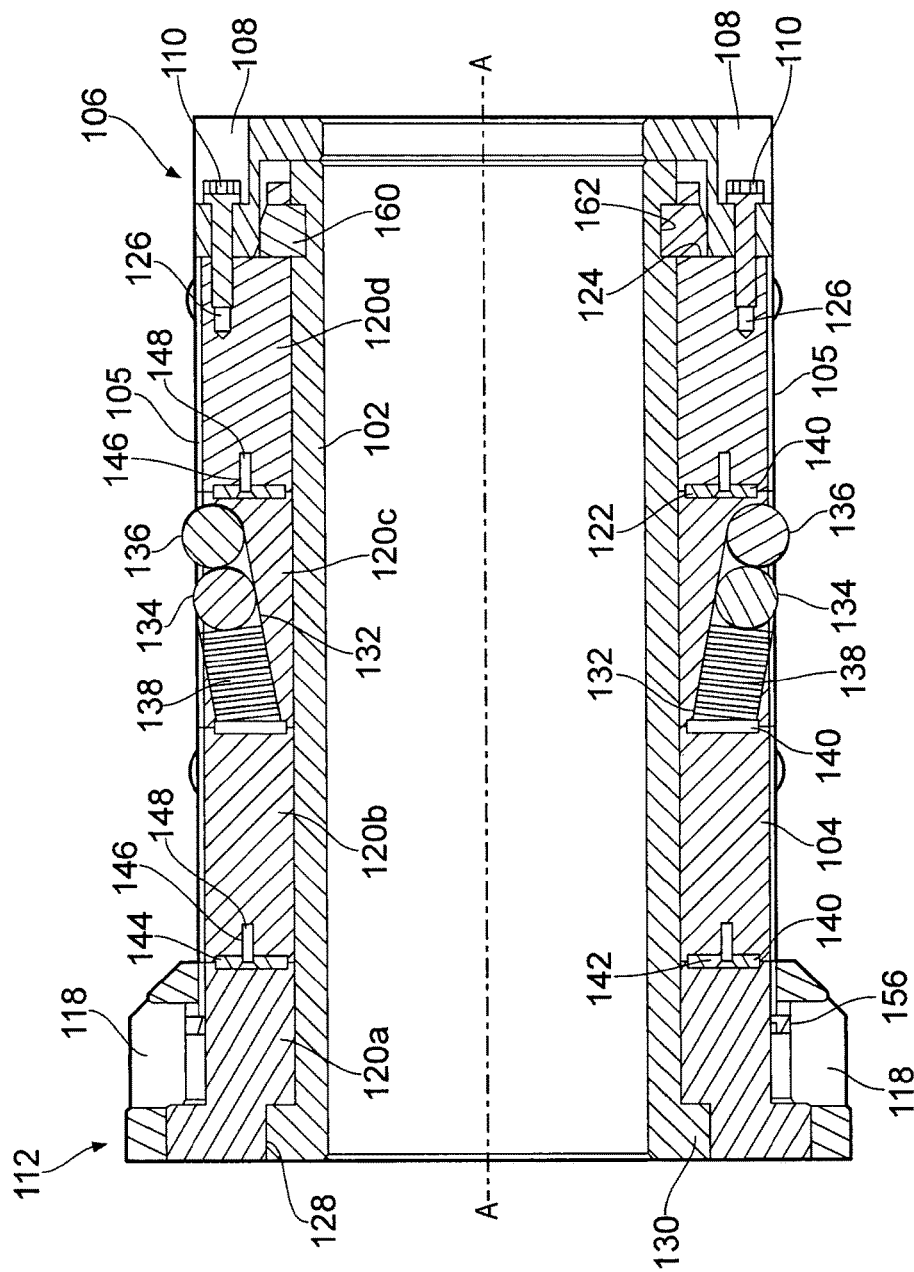
FIG. 10 is a longitudinal cross-section through the mounting device as shown in FIG. 8.

FIGS. 8 to 10 show a second embodiment of mounting device 100 which can be used in place of mounting device 24 of FIGS. 1 to 7. As will be become apparent, the mounting device 100 is used in the same way as the mounting device 24, but is configured such that the balls which retain the mounting device 100 in position can be retracted in order to facilitate removal of the mounting device when required.

The mounting device, which is formed from alloyed steel, is elongate and tubular and comprises a tubular inner sleeve 102 having an internal diameter which is the same as the internal diameter of an adjacent centraliser and cable protection device (see, for example, the centraliser 20 and able protection device 22 of FIGS. 1 to 4) and which in use receives an electrical cable (see, for example, the electrical cable 12 of FIGS. 1 to 4), an intermediate tubular sleeve 104 secured externally of the inner sleeve 102; and an outer ball-retracting sleeve 105 located externally of, and slidably mounted on, the intermediate sleeve 104. The front end of the mounting device 100 comprises a removable annular nose portion 106 having twelve identical elongate recesses 108, spaced equally around the circumference of the nose portion and extending parallel to the longitudinal axis A-A of the mounting device 100. In use, each of the recesses receives a securing bolt 110 which is threadedly received in a corresponding recess in the outer end of the intermediate sleeve 104 for attaching the nose portion 106 and for connection to the adjacent end of a centraliser (see, for example, the centraliser 20 of FIGS. 1 to 4).

The opposite, rear end of the mounting device 100 is provided with a removable collar portion 112. The outer wall of the collar portion 112 comprises a rear cylindrical wall portion 114 which is contiguous with a frusto-conical wall portion 116 forwardly of the rear cylindrical wall portion 114. As best seen in FIGS. 8 and 9, the collar portion 112 is provided with six identical apertures 118 equally angularly spaced around the circumference of the collar. As will be explained, the apertures 118 are shaped to receive a clamp of a remotely operated vehicle (ROV) for releasing the mounting device 100.

The collar portion 112 is secured in position by means of six bolts 117, equally angularly spaced around the periphery of the collar portion, passing through elongate slots 119 in the outer ball-retracting sleeve 105 and being threadedly received in the intermediate sleeve portion 104. The slots 119 through which the bolts 117 pass allow the outer sleeve to slide past the bolts 117 and also assist in aligning the direction of travel of the outer sleeve 105.

In use, a second removable collar portion (see, for example, the second collar portion 38 of FIGS. 1 to 5) is secured to the rear face of the removable collar portion 112 for attachment of a cable protection device (see, for example, the cable protection device 22 of FIGS. 1 to 4) but it has been omitted from FIGS. 8 to 10 and from the present description.

As best seen in FIG. 10, the intermediate sleeve portion 104 is formed from four sleeve ring portions 120a, 120b, 120c, 120d, each having planar annular end faces 122, 124 extending perpendicularly to the axis A-A, the ring portions being arranged face-to-face. The two central ring portions 120b, 120c are identical and the outermost ring portion 120d differs only in the provision of threaded recesses 126 for receipt of the securing bolts 110 of the nose portion 106. The innermost ring portion 120a is slightly shorter than the other three ring portions and is provided with an annular recessed shoulder portion 128 at its inner end, which receives a complementarily-shaped shoulder 130 formed at the inner end of the inner sleeve 102, and which prevents the inner sleeve 102 from passing through the intermediate sleeve 104 in a first direction.

Each of the three longitudinally outermost ring portions 120b, 120c, 120d is provided with twelve identical elongate through recesses 132. The recesses 132 are equally angularly spaced around each ring, whereby the longitudinal axes of the recesses are inclined (at the same angle) to the longitudinal axis A-A of the mounting device 100.

Each recess 132 receives two identical inner and outer engagement members which in this embodiment are formed by spherical stainless steel balls 134, 136, which are urged outwardly and towards contact with one another by means of a compression spring 138 which extends between the inner ball 60 and a retaining ring 140. A retaining ring 140 is secured to the rear face of each of the three outermost ring portions 120b, 120c, 120d and is received in a recess 142 in the rear face of those ring portions and a corresponding recess 144 in the adjacent front face of each of the three innermost ring portions 120a, 120b, 120c. The retaining rings 140 are held in place by means of twelve equally angularly spaced countersunk head bolts 146 passing through the ring and being threadedly received in a corresponding recess 148 in the rear face of the respective ring portion 120b, 120c, 120d.

The diameter of the spherical balls 134, 136 and the diameter of the through recesses 132 are chosen so that although the balls 134, 136 can project partially out of the apertures formed in the outer peripheral face of the ring portions 120b, 120c, 120d by the recesses 132, as urged by the springs 138, they are held captive in the recesses and are unable to be displaced out of the apertures forming the outer end of the recesses.

The balls 134, 136 can be retracted inwardly along their respective recesses 132, against the force of the springs 138, by means of the outer tubular ball-retracting sleeve 105. The inner diameter of the ball-retracting sleeve 105 is the same as the outer diameter of the intermediate sleeve 104 and the ball-retracting sleeve 105 is slidably displaceable along the intermediate sleeve 104. In normal use, however, the retaining sleeve 105 is secured in the position shown in FIGS. 8 and 10, with the outer end in abutment with the rear face of the nose portion 106, by means of a shear bolt 152 which is received in a corresponding threaded recess (not shown) in a clamp ring 156 which is secured to the innermost end of the ball-retracting sleeve 105 for retraction of the balls, when desired, as will be explained. The ball-retracting sleeve 105 is provided with three rows of tear-shaped apertures 158, each aperture corresponding in position to a respective one of the ball-receiving apertures 132. The diameter of the balls 134, 136 and the diameter of the tear-shaped apertures 158 are chosen so that, when the retaining sleeve 115 is in the "normal" position shown in FIGS. 8 and 10, the balls 134, 136 can project partially out of the apertures 158 in the retaining sleeve 115, as urged by the spring 138, but are held captive in the apertures 158 and are unable to be displaced out of the apertures 158.

In use, the inner and outer spherical balls 134, 136 and the corresponding compression spring 138 are inserted into each of the recesses 132 of the ring portions 120b, 120c, 120d and are retained in position by securing a first retaining ring 140 against the rear face of the outermost ring portion 120d.

The longitudinally innermost ring portion 120a is then slid onto the inner sleeve portion 102, engaging the recessed shoulder portion 128 of the inner ring portion 120 with the projecting shoulder 130 at one end of the inner sleeve 102. The other assembled ring portions 120b, 120c, 120d are then slid in turn onto the inner sleeve portion, forming the assembled intermediate sleeve portion 104. The intermediate sleeve portion 104 is held in position on the inner sleeve 102 by means of a retaining ring 160 which is seated in a complementarily-shaped recess 162 in the curved outer face of the end ring portion 120d of the inner sleeve 102, near its front end. The retaining ring 160 is a two-piece split ring, which allows it to be removably seated in the recess 162. The nose portion 106 is then slid onto the protruding end of the inner sleeve 102, in contact with the retaining ring 160, and is held in position on the end of the inner sleeve 102 by means of the securing bolts 110 which are received in corresponding recesses in the outer face of the outermost ring portion 120d.

As will be apparent from the drawings, the three outermost ring portions 120b, 120c, 120d are mounted on the inner sleeve 102 so that the ball-receiving recesses 132 of the recesses 120b, 120d are aligned with each other and so that the ball receiving recesses 132 of ring portion 120c are offset so that they lie midway between the recesses of the two other rings 120b, 120d.

Finally, the outer, ball-retracting sleeve 105 and the collar 112 are slid onto the assembled intermediate sleeve 104. The collar portion 112 is secured in position by means of the retaining bolts 117 and the outer sleeve 105 is fixed in position with respect to the collar portion 112 by means of the shear bolt 152 which is received in a threaded recess in the clamp ring 156 secured to the innermost end of the ball-retracting sleeve 105.

Figure 4:
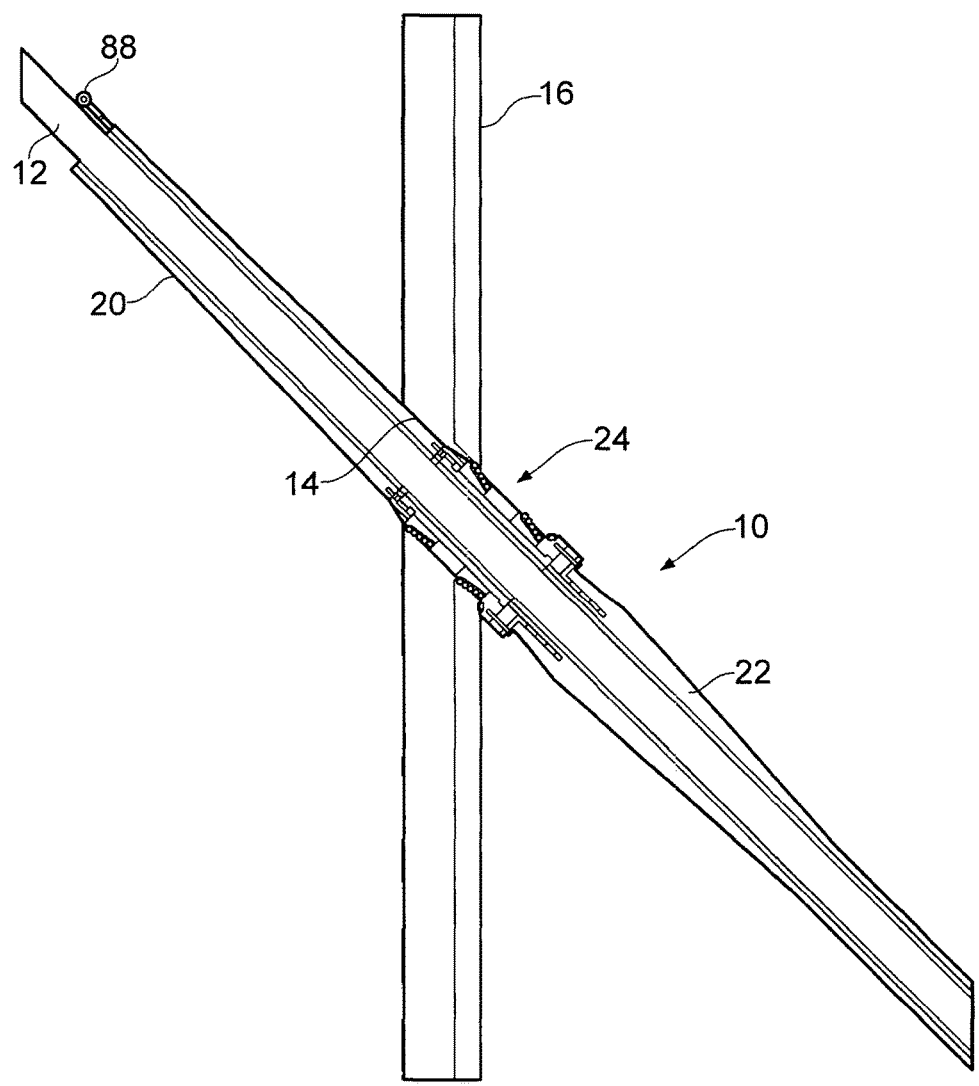
FIG. 4 is a vertical cross-section through the cable protection assembly of FIG. 1.

The assembled mounting device 100 is then secured to the rear end of a centraliser (see, for example, the centraliser 20 of FIGS. 1 to 4) and to the front end of a cable protection device (see, for example, the cable protection device 22 of FIGS. 1 and 4). The assembled cable protection is then fitted into position in an aperture (see, for example, the aperture 14 in the wall of a support pillar 16 shown in FIGS. 1 to 4), as in the first embodiment. As the mounting device is displaced into the aperture, the balls 134, 136 are displaced inwardly against the restoring face of the springs 138. When the mounting device has been inserted into the aperture to its fullest extent, it remains held in place in the aperture. It is prevented from passing further through the aperture in the forward direction by engagement of the collar 112 with the outer face of the, for example, support pillar 16 in which it is secured. Moreover, and as in the first embodiment, any attempt to move it in the opposite, reverse direction will cause the balls 134, 136 which are engaged with boundary of the aperture, to be urged radially outwardly, into strong engagement with the aperture, thereby preventing the mounting device 100 from being displaced out of the aperture.

As in the first embodiment, the use of two balls 134, 136 in each recess results in a rolling motion of the balls as they engage the boundary of the aperture within which the mounting device is inserted, thereby reducing friction. Moreover, the configuration of the apertures and the associated balls (in particular the offsetting of the balls of the ring portions 120b, 120c, 120d) prevents the mounting device from being withdrawn out of the aperture in the rearward direction, irrespective of the orientation of the aperture, and also ensures that a minimum of ten balls 136 engage the boundary of the aperture when connected.

In the event that it is desired to remove the mounting device, an ROV is manoeuvred so that it is adjacent the mounting device. A clamp of the ROV is inserted into the six apertures 118. The ROV clamp engages the clamp ring 154 at the inner end of the ball-retracting sleeve 105 and is used to urge the ball-retracting sleeve 105 in the direction towards the collar portion 112, as shown in FIG. 9. As the ball-retracting sleeve 105 is displaced, the periphery of each of the apertures 158 engages the corresponding outer ball 136, and causes the balls 134, 136 to be displaced inwardly, against the restoring force of the compression springs 138. Displacement of the ball-retracting sleeve 105 in this way causes the shear bolt 152 to shear, which allows this movement to take place.

As the balls 134, 136 are displaced inwardly, they are displaced out of engagement with the aperture in which the connecting device is located, which allows the connecting device and the centraliser and cable protection device connected to it, to be withdrawn from the aperture.

The connection device can be reused by fitting a new shear bolt, when desired.

Although the connecting device is intended to remain in place for extended periods of time, the provision of the ball-retracting sleeve 105 greatly facilitates removal of the connecting device, if it is ever required.

The invention is not restricted to the details of the foregoing embodiments.

For example, one or more, and preferably all, of the balls 60, 62, 134, 136 can be replaced with an alternative engagement means, such as a roller, for example, rotatably mounted on an axle whose ends are slidably disposed in grooves in the walls of the recesses 58, 132.

Moreover, although the embodiments described relate to the securing of a cable protection device (in the form of a bend stiffener) in an aperture in the wall of a support pillar of an offshore wind turbine, the invention can be applied much more broadly, to the securing of a member passing through an aperture.

Furthermore, the mounting devices 24, 100 are described as being made from alloyed steel, typical examples of which are medium or high strength alloy steel. However, the mounting device may be made from different materials including, but not limited to, a truly alloyed stainless steel derived steel, such as stainless steel, Inconel or Super Duplex stainless steel.

In addition, the centraliser 20 and the cable protection device 22 are described as bend stiffeners in the above embodiments. However, they need not be bend stiffeners. For example, the cable protection device 22 may instead comprise a bend restrictor, a rigid tube or an elongate rigid two-piece shell (e.g. Uraduct®).

The invention claimed is:

1. A mounting device for an elongate flexible member extending through a wall of a structure, comprising:
   an elongate body having a longitudinal axis;
   an internal passageway passing through the elongate body parallel to the longitudinal axis for receipt of the elongate flexible member;
   a plurality of elongate recesses in the elongate body, an axis of each elongate recess being inclined to the longitudinal axis of the elongate body;
   a plurality of apertures in an outer peripheral face of the elongate body, each of the apertures corresponding to a respective one of the elongate recesses;
   an engagement member displaceably mounted in each elongate recess for movement along the each elongate recess, the engagement members, the elongate recesses and the apertures being dimensioned to allow the engagement members to project partially beyond the outer peripheral face of the elongate body but to prevent the engagement members from leaving the elongate recesses through the apertures in the outer peripheral face of the elongate body; and
   spring means biasing the engagement members along the elongate recesses toward the apertures in the outer peripheral face of the elongate body.

2. The mounting device as claimed in claim 1, wherein the internal passageway is cylindrical.

3. The mounting device as claimed in claim 1, wherein the outer peripheral face of the elongate body is cylindrical.

4. The mounting device as claimed in claim 1, the plurality of elongate recesses comprising a plurality of identical recesses.

5. The mounting device as claimed in claim 4, the plurality of identical recesses being inclined at a same angle with respect to the longitudinal axis of the elongate body.

6. The mounting device as claimed in claim 1, the plurality of elongate recesses comprising a first plurality of elongate recesses spaced around the elongate body at a first longitudinal position of the elongate body.

7. The mounting device as claimed in claim 6, the plurality of elongate recesses further comprising a second plurality of elongate recesses spaced around the elongate body at a second longitudinal position of the elongate body.

8. The mounting device as claimed in claim 7, wherein the elongate recesses of the first plurality of elongate recesses are offset circumferentially with respect to the elongate recesses of the second plurality of elongate recesses.

9. The mounting device as claimed in claim 7, wherein the elongate body comprises a first annular member in which the first plurality of elongate recesses are located and a second annular member in which the second plurality of elongate recesses are located.

10. The mounting device as claimed in claim 9, wherein the elongate body further comprises a sleeve on which the first and second annular members are located.

11. The mounting device as claimed in claim 10, wherein the sleeve forms the internal passageway through the elongate body.

12. The mounting device as claimed in claim 1, comprising a plurality of engagement members displaceably mounted in each elongate recess.

13. The mounting device as claimed in claim 12, the plurality of engagement members comprising a first engagement member displaced to project partially out of the aperture in the outer peripheral face of the elongate body and a second engagement member in engagement with the first engagement member.

14. The mounting device as claimed in claim 13, wherein the spring means engages the second engagement member.

15. The mounting device as claimed in claim 1, wherein the spring means is located in the elongate recess.

16. The mounting device as claimed in claim 1, at least one of the plurality of elongate recesses extending to the outer peripheral face of the elongate body, an outer end of the at least one of the plurality of elongate recesses forming the aperture in the outer peripheral face of the elongate body.

17. The mounting device as claimed in claim 1, further comprising means for displacing the engagement members inwardly along the elongate recesses.

18. The mounting device as claimed in claim 17, further comprising means for selectively engaging a projecting part of the engagement members to displace them inwardly.

19. The mounting device as claimed in claim 18, further comprising movable engagement means on an exterior of the elongate body.

20. The mounting device as claimed in claim 19, further comprising a movable tubular sleeve member which forms at least a part of the exterior of the elongate member.

21. The mounting device as claimed in claim 20, wherein the apertures through which the engagement members project are provided in the movable tubular sleeve member.

22. The mounting device as claimed in claim 20, further comprising one or more additional apertures for engagement of the tubular sleeve member in order to displace the tubular sleeve member in a direction which causes the engagement members to be displaced inwardly.

23. The mounting device as claimed in claim 1, wherein one or more of the engagement members comprises a ball.

24. The mounting device as claimed in claim 23, wherein each of the engagement members comprises a ball.

25. The mounting device as claimed in claim 20, wherein the movable tubular sleeve member comprises a projection which is accessible through the one or more additional apertures.

26. The mounting device as claimed in claim 19, comprising means for retaining the movable engagement means in a first position.

27. The mounting device as claimed in claim 26, the means for retaining the movable engagement means in the first position comprising a shear bolt.

28. A mounting device for an elongate flexible member extending through a wall of a structure, comprising:
an elongate body having a longitudinal axis;
an internal passageway passing through the elongate body parallel to the longitudinal axis for receipt of the elongate flexible member;
a plurality of elongate recesses in the elongate body an axis of each elongate recess being inclined to the longitudinal axis of the elongate body;
a plurality of apertures in an outer peripheral face of the elongate body, each of the apertures corresponding to a respective one of the elongate recesses;
an engagement member displaceably mounted in the each elongate recess for movement along the elongate recess, the engagement members, the elongate recesses and the apertures being dimensioned to allow the engagement members to project partially beyond an outer peripheral face of the elongate body but to prevent the engagement members from leaving the elongate recesses through the apertures in the outer peripheral face of the elongate body;
biasing means biasing the engagement members along the elongate recesses toward the apertures in the outer peripheral face of the elongate body;
connecting means for connection to an elongate hollow protective device for passage of the elongate flexible member; and
connecting means at both ends of the elongate body, each for connection to an elongate hollow protective device.

29. The mounting device as claimed in claim 28, comprising connecting means for connection to a centraliser.

30. The mounting device as claimed in claim 28, comprising connecting means for connection to a cable protection device.

31. The mounting device as claimed in claim 28, comprising connecting means for connection to a bend stiffener.

32. A protection device for an elongate flexible member, comprising:
a mounting device comprising:
an elongate body having a longitudinal axis;
an internal passageway passing through the elongate body parallel to the longitudinal axis for receipt of the elongate flexible member;
a plurality of elongate recesses in the elongate body an axis of each elongate recess being inclined to the longitudinal axis of the elongate body;
a plurality of apertures in an outer peripheral face of the elongate body, each of the apertures corresponding to a respective one of the elongate recesses;
an engagement member displaceably mounted in the each elongate recess for movement along the elongate recess, the engagement members, the elongate recesses and the apertures being dimensioned to allow the engagement members to project partially beyond an outer peripheral face of the elongate body but to prevent the engagement members from leaving the elongate recesses through the apertures in the outer peripheral face of the elongate body;
biasing means biasing the engagement members along the elongate recesses toward the apertures in the outer peripheral face of the elongate body; and
two elongate hollow protective devices connected at opposite ends of the mounting device.

33. The mounting device as claimed in claim 1, wherein the engagement members are displaceable inwardly along the elongate recesses against a restoring force of the spring means.

34. The mounting device as claimed in claim 1, wherein the engagement members are displaceable along their respective elongate recesses independently of each other.

35. The mounting device as claimed in claim 28, wherein the engagement members are displaceable inwardly along the elongate recesses against a restoring force of the biasing means.

36. The mounting device as claimed in claim 28, wherein the engagement members are displaceable along their respective elongate recesses independently of each other.

37. The mounting device as claimed in claim 28, wherein one or more of the engagement members comprises a ball.

38. The mounting device as claimed in claim 37, wherein each of the engagement members comprises a ball.

39. The mounting device as claimed in claim 1, further comprising means for retaining the movable engagement means in a first position.

40. The mounting device as claimed in claim 39, the means for retaining the movable engagement means in the first position comprising a shear bolt.

* * * * *